United States Patent [19]

Yamazaki et al.

[11] Patent Number: 5,067,086
[45] Date of Patent: Nov. 19, 1991

[54] THREE-DIMENSIONAL SHAPE MACHINING LASER DEVICE

[75] Inventors: Etsuo Yamazaki, Hachioji; Nobuaki Iehisa, Minamitsuru, both of Japan

[73] Assignee: Fanuc, Ltd., Minamitsuru, Japan

[21] Appl. No.: 397,460

[22] PCT Filed: Jan. 6, 1989

[86] PCT No.: PCT/JP89/00005
    § 371 Date: Aug. 21, 1989
    § 102(e) Date: Aug. 21, 1989

[87] PCT Pub. No.: WO89/06174
    PCT Pub. Date: Jul. 13, 1989

[30] Foreign Application Priority Data

Jan. 8, 1988 [JP] Japan .................. 63-002143

[51] Int. Cl.⁵ .................. G06F 15/46; B23K 26/02
[52] U.S. Cl. .................. 364/474.08; 219/121.79;
                                219/121.83; 364/474.03
[58] Field of Search .................. 364/474.08, 474.03,
        364/474.16, 474.17, 474.18, 474.37; 318/576,
        577, 578; 219/121.63, 121.64, 121.82, 121.78,
                        121.79, 121.83, 124.02, 124.34

[56] References Cited

U.S. PATENT DOCUMENTS 4,626,999 12/1986 Bannister .................. 364/474.08
4,659,900  4/1987 Gilli et al. .................. 219/121.79 X
4,794,222 12/1988 Funayama et al. .......... 219/121.83 X Primary Examiner—Joseph Ruggiero
Attorney, Agent, or Firm—Staas & Halsey

[57] ABSTRACT

A three-dimensional shape machining laser device for performing three-dimensional machining. The device comprises a teaching box (20) for teaching NC commands, a sensor (43) for detecting the distance between the distal end of a nozzle and a work, a control apparatus (10) which includes command storage apparatus for storing the NC commands, NC command execution apparatus for executing the NC commands, tracing apparatus for controlling the gap between the nozzle and the work to a predetermined value, interrupt control apparatus for interrupting the execution of an NC command program, correction value calculation apparatus for calculating correction command values used for correcting coordinate values, and correction apparatus for correcting command values in accordance with the correction command values, etc. Tracer control is performed during execution of the NC commands, and when an amount of deviation from a path according to the NC commands exceeds a predetermined value, correction values are inserted to correct the path. Alternatively, the NC commands are executed without performing the tracer control. When an amount of deviation of the gap exceeds a predetermined value, correction values are inserted to correct the path. Teaching data can therefore be easily checked for accuracy and corrected, whereby reliable teaching data can be obtained.

4 Claims, 5 Drawing Sheets

THREE-DIMENSIONAL SHAPE MACHINING LASER DEVICE

TECHNICAL FIELD

The present invention relates to a three-dimensional shape machining laser device for performing three-dimensional machining, and more particularly to a three-dimensional shape machining laser device having the function of correcting teaching data.

BACKGROUND ART

CNC laser machining devices including a combination of a laser oscillator and a numerical control (CNC) apparatus have come to be widely used. By combining high-speed machining provided by the laser machining device with complex contouring control achieved by the numerical control (CNC) apparatus, machining of a complex shape can be performed in a non-contact fashion and at high speed. Particularly, three-dimensional machining, which cannot be effected with a conventional punch press, nibbling machine or the like, can be achieved by three-dimensional shape machining laser devices which have been put to practical use. To carry out three-dimensional machining with the three-dimensional shape machining laser device, not only X, Y and Z axes but the pose of a nozzle arranged at a distal end portion of the device needs to be controlled. Usually, the nozzle is controlled in terms of $\alpha$ and $\beta$ axes. In the three-dimensional shape machining laser device, therefore, the $\alpha$ and $\beta$ axes in addition to the X, Y and Z axes must be controlled by means of machining commands.

However, in most cases, it is very hard to program such commands based on drawings. Therefore, geometric data of shape is usually collected while the distal end of the nozzle is positioned on an actual work, so that NC commands may be generated based on the data obtained. This process is accomplished through manual operation of teaching box by an operator.

In this teaching process, however, the nozzle is positioned on the work through manual operation, and, after the pose of the nozzle is controlled, a memory button is depressed so that the positions of the respective axes then assumed are used as NC commands. In consequence, precision of the NC commands obtained by the teaching i.e., precision of the teaching data, depends on positioning conditions of the nozzele and accordingly is not very high in general.

If an error produced in this process is so great that it cannot be absorbed by tracer control, the corresponding part of the work cannot be machined and is left unprocessed.

SUMMARY OF THE INVENTION

In view of the circumstances described above, it is an object of the present invention to provide a three-dimensional shape machining laser device having the function of correcting teaching data.

To achieve the object, the present invention provides a three-dimensional shape machining laser device for performing three-dimensional machining, which comprises a teaching box for teaching NC commands relating to X, Y and Z axes and a pose of a nozzle, command storage means for storing the NC commands, NC command execution means for executing the NC commands, a sensor arranged in the proximity of the distal end of the nozzle, for detecting the distance from a work, tracing means for controlling the gap between the nozzle and the work to a predetermined value in accordance with the distance detected by the sensor, interrupt control means for performing tracer control during execution of the NC commands, detecting a deviation from a path according to the NC commands, and for interrupting the excution of an NC command program when an amount of the deviation exceeds a predetermined value, correction value calculation means for calculating correction command values used for correcting coordinate values of the X, Y and Z axes, based on the amount of devation, the coordinate values and pose data of the nozzle, and correction means for correcting command values in accordance with the correction cammand values.

The present invention also provides a three-dimensional shape machining laser device for performing three-dimensional machining, which comprises a teaching box for teaching NC commands relating to X, Y and Z axes and a pose of a nozzle, command storage means for storing the NC commands, NC command execution means for executing the NC commands, a sensor arranged in the proximity of the distal end of the nozzle, for detecting the distance from a work, interrupt control means for detecting a deviation of the distance from a normal gap, and for interrupting the execution of an NC command program when an amount of the deviation exceeds a predetermined value, correction value calculation means for calculating correction command values used for correcting coordinate values of the X, Y and Z axes, based on the amount of deviation, the coordinate values and pose data of the nozzle, and correction means for correcting command values in accordance with the correction command values.

The tracer control is performed during the execution of the NC commands such that the gap between the distal end of the nozzle and the work is controlled to the predetermined value. When the amount of deviation of the nozzle axis from the reference position exceeds a given value, the execution of the NC command program is interrupted, the deviation amount is calculated based on the coordinate values and the pose of the nozzle then assumed, and the correction value is inserted as a separate command value, so as to correct the path of the nozzle.

Alternatively, the NC commands may be executed without performing the tracer control. When the amount of deviation from the normal gap exceeds the predetermined value, the execution of the NC command program is stopped. The deviation amount is calculated based on the coordinate values and the pose of the nozzle then assumed, and the correction value is inserted as a separate command value, thereby to correct the nozzle path.

DESCRIPTION OF THE PREFERRED EMBODIMENT

An embodiment of the present invention will be described with reference to the accompanying drawings.

Figure 1:
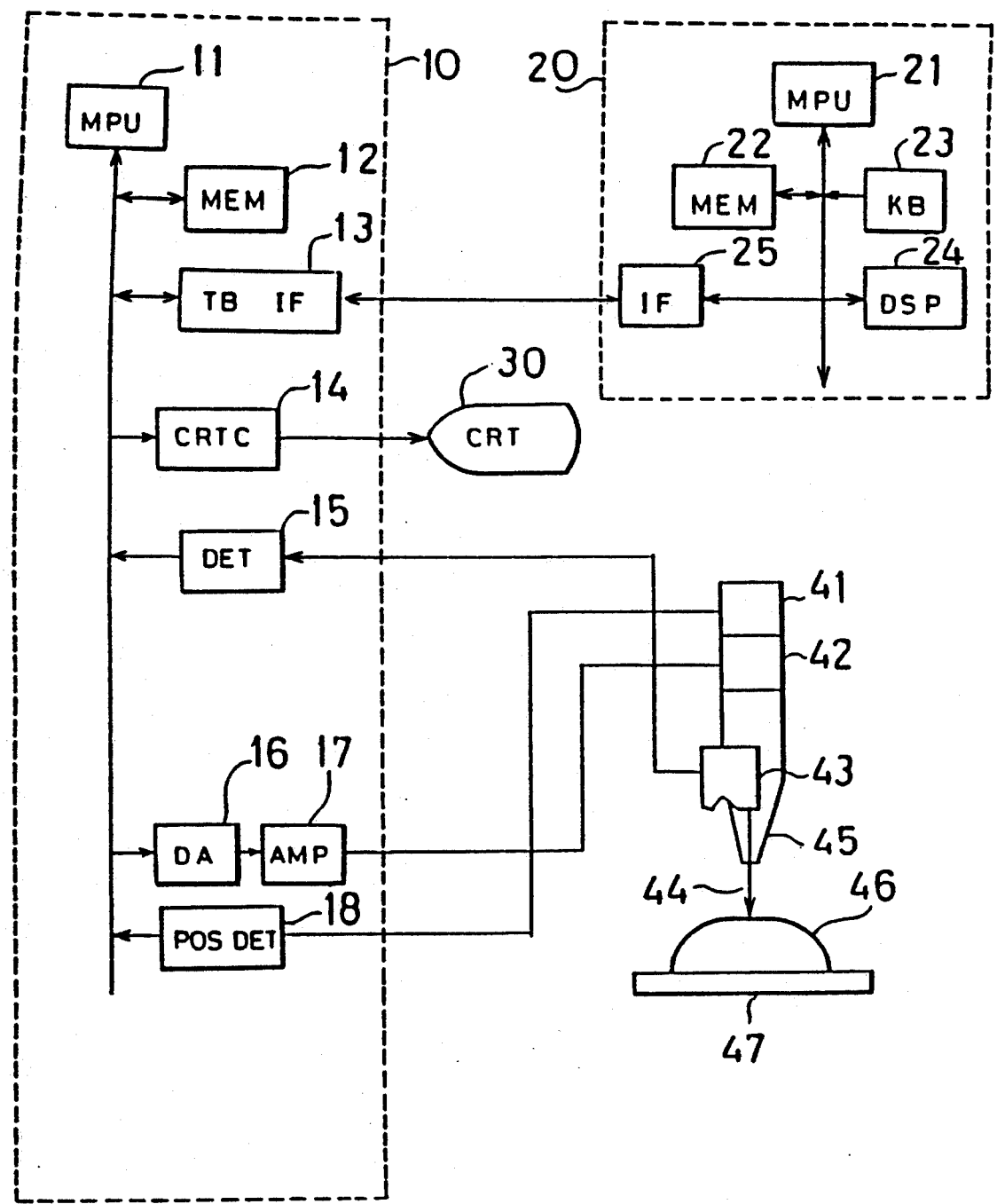
FIG. 1 is a block diagram illustrating a three-dimensional shape machining laser device according to an embodiment of the present invention.

FIG. 1 is a block diagram of a three-dimensional shape machining laser device according to an embodiment of the present invention. In the figure, reference numeral 10 denotes a control apparatus which stores and executes NC commands and performs tracer control.

Designated at 11 is a processor for global control, 12 a memory for storing control programs, and 13 an interface circuit for a teaching box and in this embodiment, an RS-232C interface is used. Numeral 14 denotes a display control circuit for generating display data and delivering the same, and 15 denotes a distance detection circuit which subjects a signal from a distance sensor to AD conversion for input to the processor 11.

Denoted at 16 is a DA converter for converting distributed pulses from the processor 11 into analog voltages, and 17 a servo amplifier for driving a servomotor. Numeral 18 represents a position control circuit for detecting a position signal from a position sensor attached to the servomotor.

Numeral 20 denotes the teaching box, referred to above, comprising an operating panel by means of which teaching is carried out by an operator. Denoted at 21 is a processor for globally controlling the teaching box 20. Numeral 22 designates a memory for temporal storage of teaching data etc., 23 a keyboard, and 24 a display for displaying brief data and in this embodiment, a liquid-crystal display is used. Designated at 25 is an interface circuit for connection to the control apparatus 10.

Numeral 30 represents a display unit which, upon receiving video signals from the display control circuit 14, displays various data including an alarm signal, which will be described hereinafter.

Denoted at 41 is the position sensor for the servomotor 42, mentioned above. The servomotor 42 serves to drive a tracing axis. Designated at 43 is the distance sensor which detects the gap between a nozzle 45 and a work 46 and, in this embodiment, a laser measurement device using a semiconductor laser is used, and numeral 44 denotes a laser beam for measurement. Alternatively, an electrostatic capacity distance sensor which detects a distance based on the electrostatic capacity, a magnetic sensor which detects an eddy current for measurement of distance, or other sensor may be used for this purpose. Numeral 47 denotes a machine table on which the work 46 is fixed.

A laser beam for machining, not shown, is radiated from the nozzle 45 onto the work 46, to effect machining of the work 46, such as cutting, trimming and the like. FIG. 1 shows only a servo system associated with the servomotor for the tracing axis, etc., and servo systems for other axes are not illustrated in the figure.

The operator first operates the teaching box 20 so as to bring the distal end of the nozzle 45 to the work 46, and then controls the pose of the nozzle by the $\alpha$ and $\beta$ axes to collect teaching data relating to individual points. The teaching data is temporarily stored in the memory 22, and then stored in the memory 12 of the control apparatus in certain quantities.

After the teaching data is collected, it is checked for accuracy and corrected before laser machining. In doing this, one of the following two methods may be used.

According to the first method, tracer control is performed concurrently with the execution of the teaching data, i.e., NC commands. This method is effective in the case where the precision of the teaching data is coarse, for example.

More specifically, while the NC commands are executed, the gap between the distal end of the nozzle 45 and the work 46 is measured based on the detection data from the sensor 43, thereby to perform tracer control. In consequency, the distal end of the nozzle 45 is controlled fundamentally by the NC commands, and at the same time is subject to the tracer control wherein it is controlled by the movement of the tracing axis such that the distance from the work 46 is constant.

Figure 2:
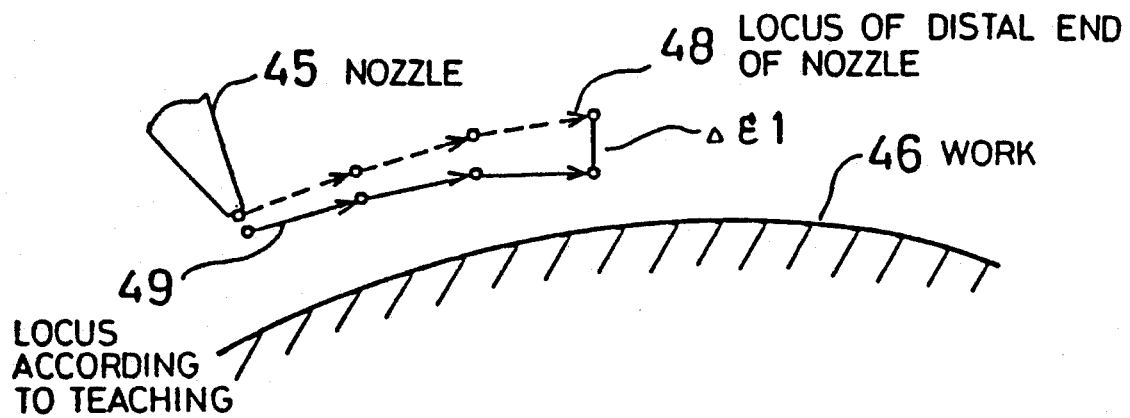
FIG. 2 is a diagram illustrating a locus of the distal end of a nozzle during the execution of NC commands and tracer control.

A locus of the distal end of the nozzle during the execution of NC commands and the tracer control is illustrated in FIG. 2. In the figure, numeral 45 denotes the nozzle, 46 the work, 48 the actual locus of the distal end of the nozzle 45, and 49 a locus according to the NC commands. If, during operation, a deviation amount $\Delta\epsilon 1$ indicative of the deviation of the actual locus 48, controlled by the tracer control, from the locus 49 according to the NC commands exceeds a predetermined value, the execution of the NC commands is interrupted and the teaching data is corrected, as will be described hereinafter in detail.

Figure 3:
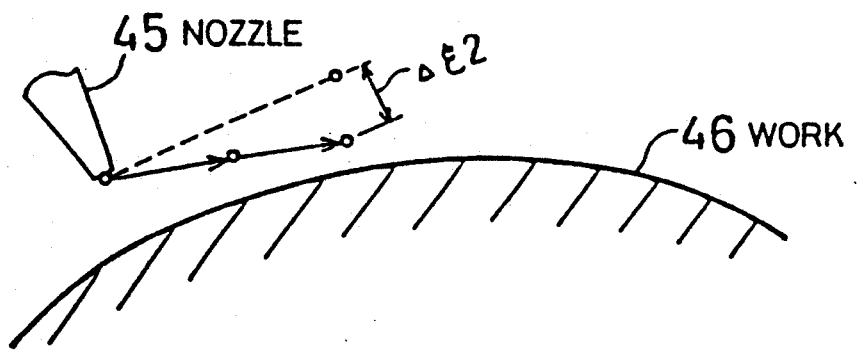
FIG. 3 is a diagram illustrating a locus of the nozzle during the execution of the NC commands alone.

In the second method, the NC commands are executed without performing the tracer control. The method is effective in the case where the teaching data is collected in detail, for example. FIG. 3 illustrates a locus of the nozzle during the execution of the NC commands alone. In the figure, Numeral 45 denotes the nozzle, and 46 the work. In this case, when a deviation $\Delta\epsilon 2$ of the actual gap between the distal end of the nozzle 45 and the work 46, from a normal gap exceeds a predetermined value, the deviation amount is corrected, as will be hereinafter described in detail.

Figure 4:
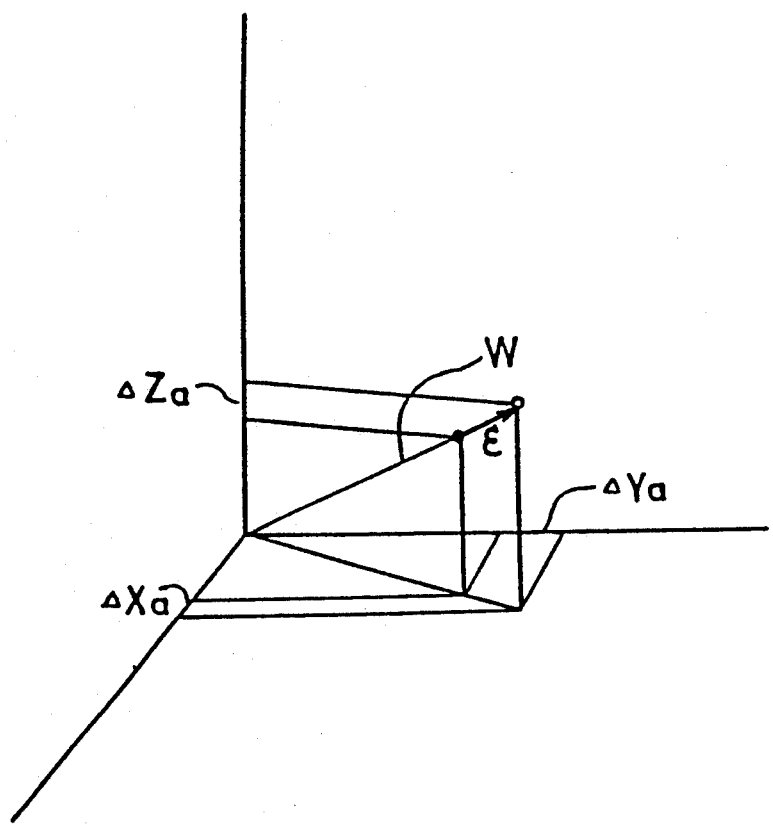
FIG. 4 is a diagram illustrating how a correction value is obtained from a deviation amount.

Now, the correction will be explained in detail. FIG. 4 illustrates how a correction value is obtained. In the figure, $\epsilon$ denotes the deviation vector to be corrected. The coordinate values of the X, Y and Z axes and the values of the $\alpha$ and $\beta$ axes for controlling the pose of the nozzle are stored in the memory 12 of the control apparatus 10. Based on these values, correction values $\Delta Xa$, $\Delta Ya$ and $\Delta Za$ can be obtained.

More specifically, based on the $\alpha$ and $\beta$ axes for control of the pose of the nozzle, unit vectors for the individual axes $$X \text{ axis} = f(\alpha,\beta)$$

$$Y \text{ axis} = g(\alpha,\beta)$$

$$Z \text{ axis} = h(\alpha,\beta)$$

are calculated. On the other hand, based on the deviation amount and the mechanical position of the W axis, individual axial components of error in positioning the distal end of the nozzle are calculated as follows:

$$\Delta Xa = (\epsilon = w) \times f(\alpha,\beta)$$

$$\Delta Ya = (\epsilon = w) \times g(\alpha,\beta)$$

$$\Delta Za = (\epsilon = w) \times h(\alpha,\beta)$$

Based on the error, the mechanical positions of the X, Y and Z axes are corrected.

$X_a + \Delta X_a \rightarrow X_a$ $Y_a + \Delta Y_a \rightarrow Y_a$ $Z_a + \Delta Z_a \rightarrow Z_a$ These mechanical positions are converted into NC commands.

G01X$\underline{X_a}$Y$\underline{Y_a}$Z$\underline{Z_a}$A$\underline{\alpha}$B$\underline{\beta}$Fxx:

(The underlined portions indicate NC commands). The commands are inserted into the subsequent block of the NC commands.

Figure 5A:
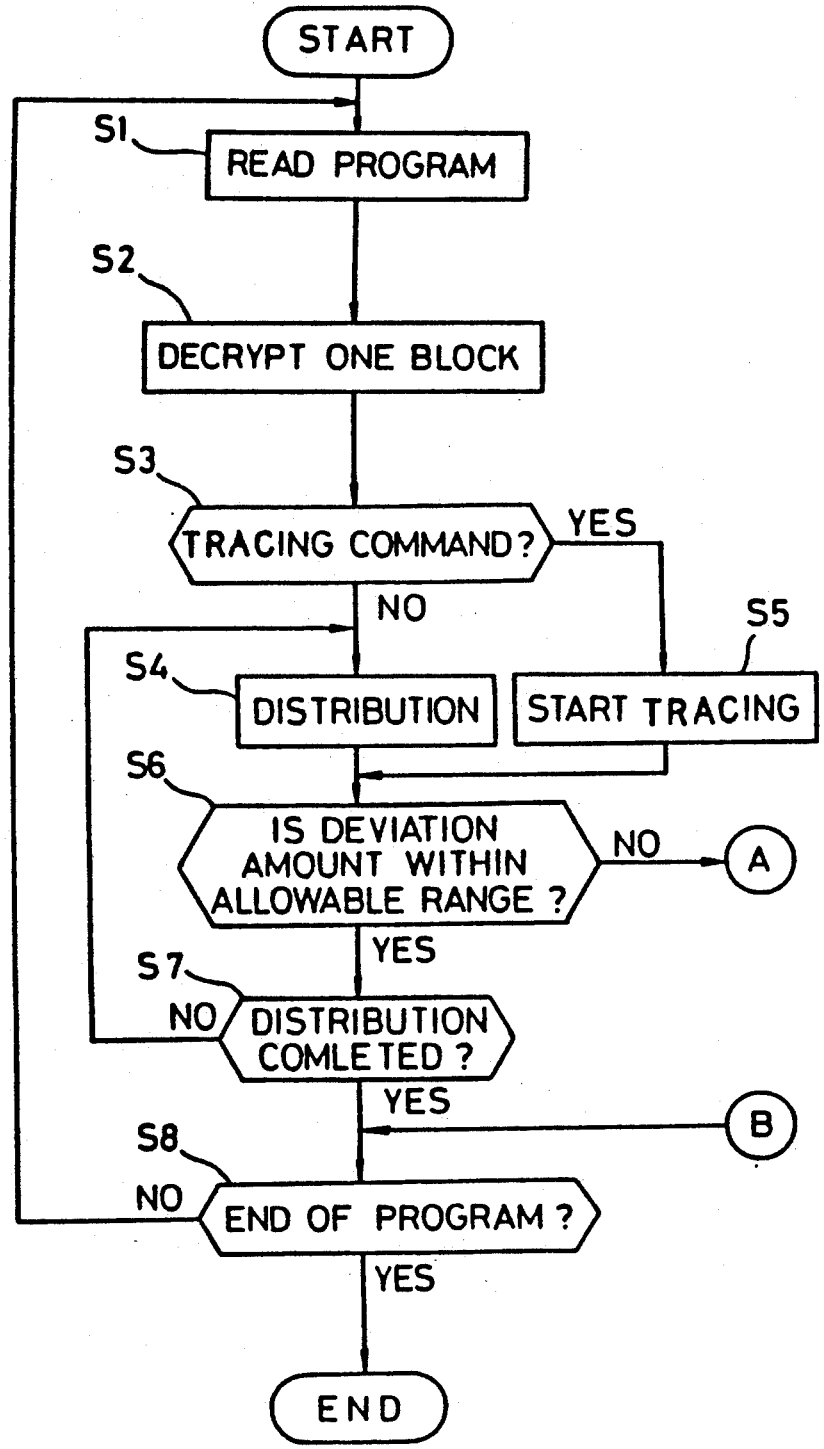
FIG. 5(a) and FIG. 5(b) are flowcharts illustrating processes according to an embodiment of the present invention.
Figure 5B:
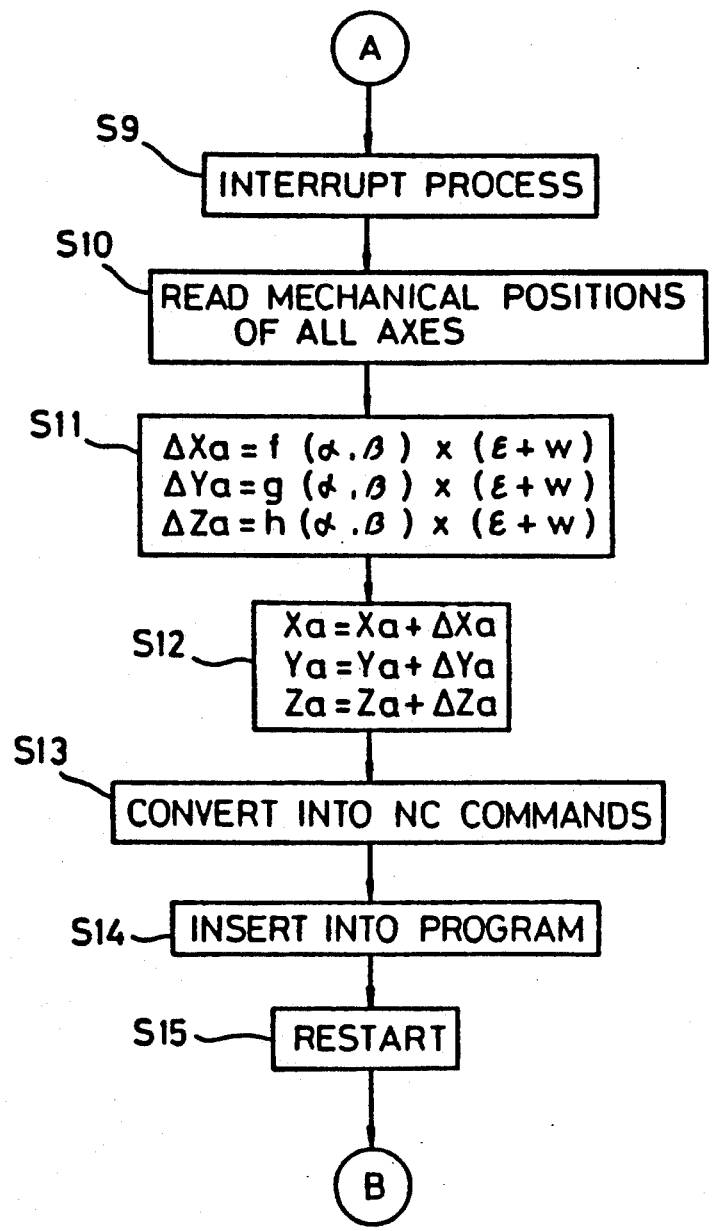

Next, a process of the above-mentioned control will be described. FIG. 5(a) and FIG. 5(b) are flowcharts illustrating the processing according to an embodiment of the present invention. In the figure, the numerals following the letter "S" denote the numbers of steps.

[S1] An NC command program is read from the memory 12.

[S2] Description of one block is performed.

[S3] It is determined whether there is a tracing command. In this embodiment, the tracing command is instructed by a model G code. If there is no tracing command, the program proceeds to S4, and if a tracing command is detected, the program proceeds to S5.

[S4] Since no tracing command is detected, the NC commands are executed as they are.

[S5] Since a tracing command is detected, the trace control is performed.

[S6] A determination is made as to whether the deviation amount is within an allowable range. If the deviation amount is outside the allowable range, the program proceeds to S9, while when the deviation amount is within the allowable range, the program proceeds to S7.

[S7] It is determined whether pulse distribution is completed If it is not completed, the program proceeds to S4 to continue pulse distribution, while when the pulse distribution is completed, the program proceeds to S8.

[S8] A determination is made as to whether all the NC command program is ended. When the program is not ended, the program returns to S1 to read the subsequent block for execution.

[S9] Since the deviation amount is outside the allowable range, an interrupt process is executed.

[S10] Coordinate points of all the axes, X, Y, Z, $\alpha$ and $\beta$ are read.

[S11] Correction values for the X, Y and Z axes are obtained from the deviation amount.

[S12] New coordinate values are obtained by adding the correction values.

[S13] The coordinate values are converted into Nc commands.

[S14] The NC commands are inserted into the program.

[S15] The program is restarted, that is, it returns to S8.

In the above explanation relating to the correction, the program is restarted after the correction; alternatively it may be designed to restart automatically.

As described, according to the present invention, the tracer control is performed during the execution of the NC commands, and when the deviation amount from the path according to the NC commands exceeds the predetermined value, the deviation amount is corrected. Therefore, the teaching data can be easily checked for accuracy and corrected, whereby reliable teaching data can be obtained.

Alternatively to the above, the NC commands are executed without performing the tracer control, and when the amount of deviation of the gap between the work and the nozzle from the normal gap exceeds the predetermined value, the deviation amount is corrected. The teaching data can therefore be checked for accuracy and corrected with ease, and reliable teaching data can be obtained.

We claim:

1. A three-dimensional shape machining laser device for performing three-dimensional machining of a work using a nozzle, comprising:
    means for generating NC commands relating to X, Y and Z axes and a pose of the nozzle;
    command storage means for storing the NC commands;
    Nc command execution means for executing the NC commands;
    sensor means for detecting a distance between the distal end and the work;
    tracing means for controlling the distance between the nozzle and the work to a predetermined value in accordance with the distance detected by said sensor means;
    interrupt control means for performing tracer control during execution of the NC commands, for detecting a deviation of the distal end from a path defined by the NC commands, and for interrupting the execution of an NC command program when an amount of said deviation exceeds a predetermined value;
    correction value calculation means for calculating correction command values used for correcting coordinate values of the X, y and Z axes, based on the amount of deviation, the coordinate values and pose data of the nozzle; and
    correction means for correcting NC command values in accordance with said correction command values.

2. A three-dimensional shape machining laser device according to claim 1, wherein said sensor comprises a laser distance measurement device.

3. A three-dimensional shape machining laer device for performing three-dimensional machining of a work using a nozzle, comprising:
    means for generating NC commands relating to X, Y and Z axes and a pose of the nozzle;
    command storage means for storing the NC commands;
    NC command execution means for executing the NC commands;
    sensor means for detecting a distance between the distal end and the work;
    interrupt control means for detecting a deviation of said distance from a normal gap, and for interrupting the execution of an NC command program when an amount of said deviation exceeds a predetermined value;
    correction value calculation means for calculating correction command values used for correcting coordinate values of the X, Y and Z axes, based on the amount of deviation, the coordinate values and pose data of the nozzle; and
    correction means for correcting NC command values in accordance with said correction command values.

4. A three-dimensional shape machining laser device according to claim 3, wherein said sensor comprises a laser distance measurement device.

* * * * *

UNITED STATES PATENT AND TRADEMARK OFFICE
CERTIFICATE OF CORRECTION

PATENT NO. : 5,067,086

DATED : November 19, 1991

INVENTOR(S) : Yamazaki et al.

It is certified that error appears in the above-identified patent and that said Letters Patent is hereby corrected as shown below:

Title Page [56], after line 4, insert --4,689,756  8/1987 Koyama et al........364/513--.

Col. 1,    line 39, after "of" insert --a--.

Col. 2,    line 6, "excution" should be --execution--;
           line 15, "cammand" should be --command--.

Col. 4,    line 14, "consequency," should be --consequence,--;
           line 64, "($\epsilon=\omega$)" should be --($\epsilon+\omega$)--;
           line 66, "($\epsilon=\omega$)" should be --($\epsilon+\omega$)--;
           line 68, "($\epsilon=\omega$)" should be --($\epsilon+\omega$)--.

Col. 5,    line 24, "Description" should be --Decryption--;
           line 39, "completed If" should be --completed. If--;
           line 55, "Nc" should be --NC--.

Col. 6,    line 18, "Nc" should be --NC--;
           line 34, "y" should be --Y--;
           line 42, "laer" should be --laser--.

Signed and Sealed this

Twenty-third Day of March, 1993

Attest:

STEPHEN G. KUNIN

Attesting Officer    Acting Commissioner of Patents and Trademarks